(12) United States Patent
Acharya et al.

(10) Patent No.: US 11,283,733 B2
(45) Date of Patent: Mar. 22, 2022

(54) PROXY PORTS FOR NETWORK DEVICE FUNCTIONALITY

(71) Applicant: Arista Networks, Inc., Santa Clara, CA (US)

(72) Inventors: Dipankar Bhatt Acharya, Saratoga, CA (US); Kartik Chandran, Santa Clara, CA (US); Hugh W. Holbrook, Palo Alto, CA (US); François Labonté, Menlo Park, CA (US); Sambath Kumar Balasubramanian, Fremont, CA (US)

(73) Assignee: Arista Networks, Inc., Santa Clara, CA (US)

( * ) Notice: Subject to any disclaimer, the term of this patent is extended or adjusted under 35 U.S.C. 154(b) by 30 days.

(21) Appl. No.: 16/590,349

(22) Filed: Oct. 1, 2019

(65) Prior Publication Data

US 2020/0106719 A1 Apr. 2, 2020

Related U.S. Application Data

(60) Provisional application No. 62/740,298, filed on Oct. 2, 2018.

(51) Int. Cl.
*H04L 12/28* (2006.01)
*H04L 49/00* (2022.01)

(52) U.S. Cl.
CPC .................. *H04L 49/3063* (2013.01)

(58) Field of Classification Search
CPC ............. H04L 49/3063; H04L 63/162; H04L 12/4633; H04L 63/0428; H04L 63/0485
USPC ........................................................ 370/389
See application file for complete search history.

(56) References Cited

U.S. PATENT DOCUMENTS

| | | | | |
|---|---|---|---|---|
| 10,708,245 | B2 * | 7/2020 | Sankaran | ............ H04L 63/0471 |
| 2002/0032797 | A1 * | 3/2002 | Xu | ..................... H04L 29/12009 709/238 |
| 2006/0274899 | A1 * | 12/2006 | Zhu | .......................... H04L 9/083 380/281 |
| 2008/0141023 | A1 * | 6/2008 | Qi | ....................... H04L 63/0428 713/155 |
| 2009/0113202 | A1 * | 4/2009 | Hidle | .................. H04L 63/0428 713/151 |
| 2009/0204850 | A1 | 8/2009 | Zhang et al. | |

(Continued)

FOREIGN PATENT DOCUMENTS

| | | |
|---|---|---|
| CN | 106301765 A | 1/2017 |
| CN | 106657121 A | 5/2017 |

OTHER PUBLICATIONS

"IEEE Standard for Local and Metropolitan Area Networks: Media Access Control (MAC) Security"; IEEE Computer Society, IEEE; 2006; https://ieeexplore.ieee.org/document/1678345.

(Continued)

*Primary Examiner* — Mang Hang Yeung
(74) *Attorney, Agent, or Firm* — Chamberlain, Hrdlicka, White, Williams & Aughtry

(57) ABSTRACT

Methods and systems for modifying network traffic data. The method of modifying network traffic may include receiving a network traffic data unit that includes an identifier, at a proxy port; based on the identifier, performing a proxy port action set to obtain a modified network traffic data unit; and transmitting the modified network traffic data unit towards an egress port.

18 Claims, 6 Drawing Sheets

(56) References Cited

U.S. PATENT DOCUMENTS

| | | | |
|---|---|---|---|
| 2012/0207039 A1* | 8/2012 | Srinivasan | H04L 47/2441 370/252 |
| 2013/0091350 A1 | 4/2013 | Gluck | |
| 2015/0010152 A1 | 1/2015 | Proulx et al. | |
| 2015/0269374 A1 | 9/2015 | Fan et al. | |
| 2016/0117449 A1 | 4/2016 | Hunn | |
| 2017/0366508 A1 | 12/2017 | Saraf | |
| 2019/0097745 A1* | 3/2019 | Mallela | H04J 3/0667 |

OTHER PUBLICATIONS

"Special-Purpose Multiprotocol Label Switching (MPLS) Label Values"; IANA; Nov. 8, 2002; https://www.iana.org/assignments/mpls-label-values/mpls-label-values.xhtml.

A. Farrel et al.; "Opportunistic Security in MPLS Networks"; Network Working Group; Internet-Draft; Mar. 28, 2017.

A. Huttunen et al.; "UDP Encapsulation of IPsec ESP Packets"; Network Working Group, RFC 3948; Jan. 2005.

C. Filsfils et al.; "Segment Routing Architecture"; IETF, RFC 8402; Jul. 2018.

C. Kaufman et al.; "Internet Key Exchange Protocol Version 2 (IKEv2)"; Internet Engineering Task Force (IETF), RFC 7296; Oct. 2014.

C. Kaufman; "Internet Key Exchange (IKEv2) Protocol"; Network Working Group, RFC 4306; Dec. 2005.

D. Piper; "The Internet IP Security Domain of Interpretation for ISAKMP"; Network Working Group, RFC 2407; Nov. 1998.

E. Rosen et al.; "MPLS Label Stack Encoding"; Network Working Group, RFC 3032; Jan. 2001.

E. Rosen et al.; "Multiprotocol Label Switching Architecture"; Network Working Group, RFC 3031; Jan. 2001.

International Search Report issued in corresponding Application No. PCT/US2019/054344, dated Dec. 5, 2019.

J. Viega et al.; "The Use of Galois/Counter Mode (GCM) in IPsec Encapsulating Security Payload (ESP)"; Network Working Group, RFC 4106; Jun. 2005.

K. Kompella et al.; "Allocating and Retiring Special-Purpose MPLS Labels"; Internet Engineering Task Force (IETF), RFC 7274; Jun. 2014.

M. Mahalingam et al.; "Virtual extensible Local Area Network (VXLAN): A Framework for Overlaying Virtualized Layer 2 Networks over Layer 3 Networks"; Independent Submission, RFC 7348; Aug. 2014.

S. Kent; "IP Encapsulating Security Payload (ESP)"; Network Working Group, RFC 4303; Dec. 2005.

Written Opinion issued in corresponding Application No. PCT/US2019/054344, dated Dec. 5, 2019.

International Search Report issued in corresponding Application No. PCT/US2019/054340, dated Jan. 13, 2020.

Written Opinion issued in corresponding Application No. PCT/US2019/054340, dated Jan. 13, 2020.

Chiquito, "Decrypting IPSec VPN Traffic", Mar. 6, 2018, pp. 1-8, retrieved from https://www.linkedin.com/pulse/decrypting-ipsec-vpn-traffic-paulo-chiquito?articleId=6368187318104313856 (5 pages).

CISCO, "Cisco IOS VPN Configuration Guide", pp. 1-131 (Year: 2005) (131 pages).

CISCO, "Innovations in Ethernet Encryption (802.1AE—MACsec) for Securing High Speed (1-100GE) WAN Deployments", White Paper, 2016, pp. 1-22 (Year: 2016) (22 pages).

* cited by examiner

PROXY PORTS FOR NETWORK DEVICE FUNCTIONALITY

CROSS REFERENCE TO RELATED APPLICATIONS

This patent application claims the benefit of U.S. Provisional Patent Application Ser. No. 62/740,298 filed on Oct. 2, 2018 under 35 U.S.C. § 119(e). U.S. Provisional Patent Application Ser. No. 62/740,298 is incorporated herein by reference in its entirety.

BACKGROUND

Devices and/or components of devices are often capable of performing certain functionalities that other devices and/or components are not configured to perform and/or are not capable of performing. In such scenarios, it may be desirable to provide one or more such functionalities to the devices and/or components that cannot perform the one or more functionalities.

SUMMARY

In general, in one aspect, one or more embodiments relate to a method for modifying network traffic data. The method may include receiving a network traffic data unit comprising an identifier at a proxy port; based on the identifier, performing a proxy port action set to obtain a modified network traffic data unit; and transmitting the modified network traffic data unit towards an egress port.

In general, in one aspect, one or more embodiments relate to a system for modifying network traffic data. The system may include a network device, that includes: a network port; and a first forwarding engine; a fabric operatively connected to the network device; and a proxy device operatively connected to the fabric, that includes: a second forwarding engine; and a proxy port, wherein the proxy port is configured to: receive a network traffic data unit that includes an identifier; based on the identifier, perform a proxy port action set to obtain a modified network traffic data unit; and transmit the modified network traffic data unit towards an egress port.

Other aspects of the embodiments disclosed herein will be apparent from the following description and the appended claims.

DETAILED DESCRIPTION

Figure 1:
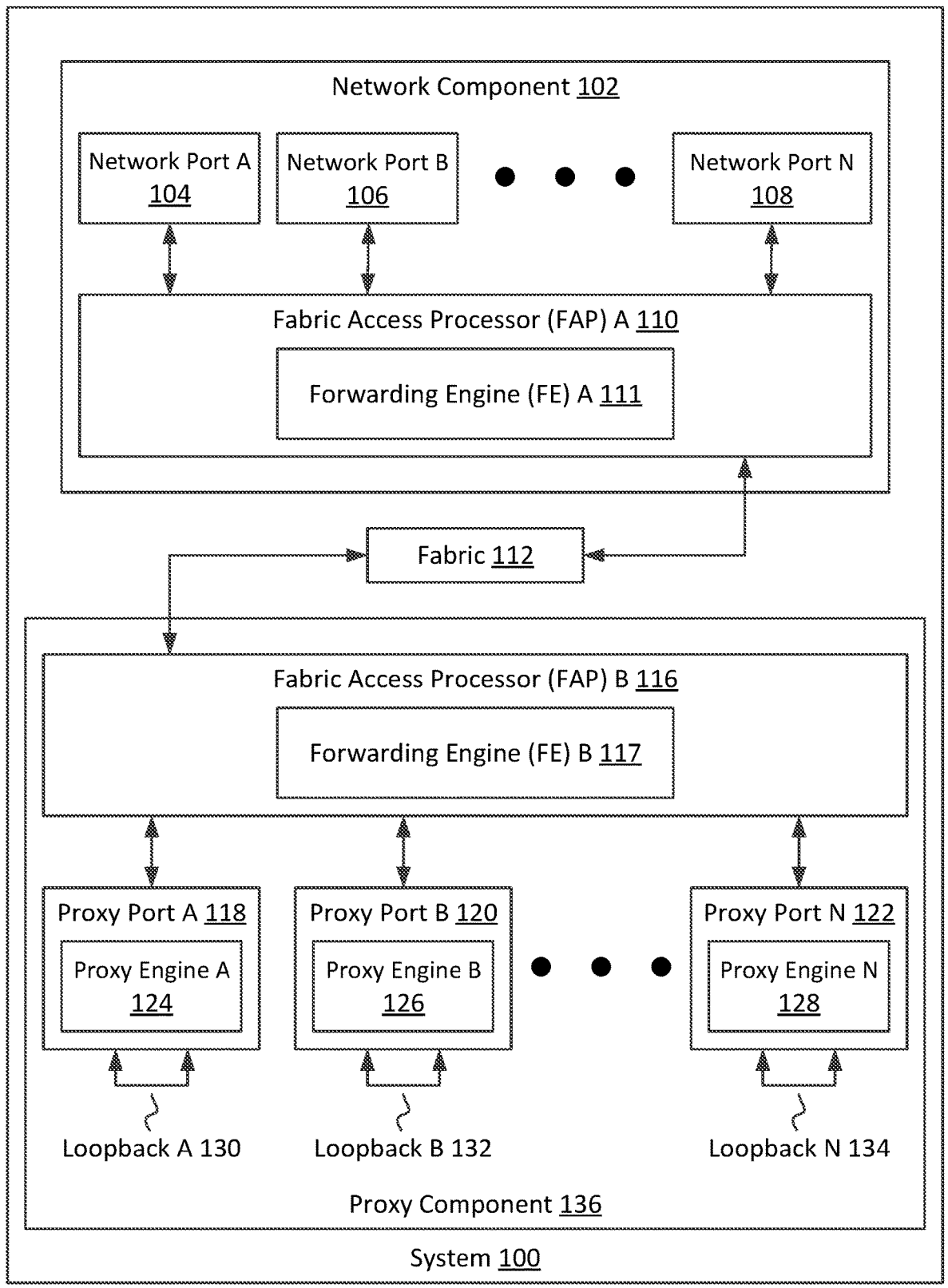
FIG. 1 shows a system in accordance with one or more embodiments.

Specific embodiments will now be described with reference to the accompanying figures. In the following description, numerous details are set forth as examples of one or more embodiments. It will be understood by those skilled in the art, and having the benefit of this Detailed Description, that one or more embodiments may be practiced without these specific details and that numerous variations or modifications may be possible without departing from the scope of the embodiments disclosed herein. Certain details known to those of ordinary skill in the art may be omitted to avoid obscuring the description.

In the following description of the figures, any component described with regard to a figure, in various embodiments disclosed herein, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments disclosed herein, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments relate to methods and systems for providing capabilities to network ports (i.e., network interfaces) that may not natively support those capabilities. Specifically, in one or more embodiments, network traffic that emanates from, or is directed toward, a designated network port may have network traffic redirected through a proxy port. The proxy port may be able to modify the network data using a capability the network port lacks. Thus, network ports that lack certain capabilities may still use utilize those one or more of such capabilities if a device or component exists elsewhere in the system having the one or more capabilities.

In one or more embodiments, the system associates one or more network ports to a single proxy port. In one or more embodiments, each network port so associated lacks the ability to manipulate or modify network traffic data units in one or more particular ways (e.g., encrypt, decrypt, sign, authenticate, verify, etc.). However, in one or more embodiments, the proxy port is able to perform the modification. Accordingly, network traffic data units received by, or to be transmitted from, network ports that are intended to be modified may be diverted through the proxy port. In one or more embodiments, the proxy port then modifies a network traffic data unit received from or destined for a network port lacking the capability to modify the network traffic data unit, with the desired modification.

FIG. 1 shows a system in accordance with one or more embodiments. In one or more embodiments, the system (100) includes network component (102), a fabric (112), and proxy component (136). In one or more embodiments, as shown in FIG. 1, network component (102) includes network port A (104), network port B (106), network port N (108), and fabric access processor (FAP) A (110). In one or more embodiments, fabric access processor (FAP) A (110) includes a forwarding engine (FE) A (111). Further, in one or more embodiments, as shown in FIG. 1, proxy component (136) includes proxy port A (118), proxy port B (120), proxy port N (122), and fabric access processor (FAP) B (116). In one or more embodiments, fabric access processor (FAP) B (116) includes a forwarding engine (FE) B (117). Additionally, each proxy port A, B, and N (118, 120, and 122) may individually include a proxy engine (e.g., proxy engine A (124), proxy engine B (126), and proxy engine N (128), respectively). Further, each proxy port A, B, and N (118, 120, and 122) may individually include a loopback (e.g., loopback A (130), loopback B (132), and loopback N (134), respectively). Each of these components and devices is described below.

In one or more embodiments, a system (100) is a network device. A network device may be a physical device that includes and/or is operatively connected to persistent storage (not shown), memory (e.g., random access memory (RAM)) (not shown), one or more processor(s) (e.g., integrated circuits) (not shown), and at least one physical network port (e.g., network port A (104), network port B (106), network port N (108)), which may also be referred to as an interface. Examples of a network device include, but are not limited to, a network switch, a router, a multilayer switch, a fibre channel device, an InfiniBand® device, etc. A network device is not limited to the aforementioned specific examples.

In one or more embodiments, a network device includes functionality to receive network traffic data units (e.g., frames, packets, tunneling protocol frames, etc.) at any of the physical network ports (i.e., interfaces) of the network device and to process the network traffic data units. In one or more embodiments, processing a network traffic data unit includes, but is not limited to, a series of one or more table lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Such a series of lookups and corresponding actions may be referred to as a 'pipeline', and, for example, may be programmed as a match-action pipeline using the P4 programming language. Examples of pipeline processing include, but are not limited to, performing a lookup to determine: (i) whether to take a security action (e.g., drop the network traffic data unit); (ii) whether to mirror the network traffic data unit; and/or (iii) how to route/forward the network traffic data unit in order to transmit the network traffic data unit from an interface of the network device. One or more actions to be taken with regards to a received network traffic data unit may be obtained by a network device based on the network traffic data unit being recognized as falling within a FEC, which may have one or more associated actions and/or items of information relevant to processing the network traffic data unit (e.g., label switched path protocol actions, multipath information, egress interface information, etc.).

In one or more embodiments, a network device also includes and/or is operatively connected to device storage and/or device memory (i.e., non-transitory computer readable mediums) storing software and/or firmware. Such software and/or firmware may include instructions which, when executed by one or more processors (not shown) of a network device, cause one or more processors to perform operations in accordance with one or more embodiments described herein.

In one or more embodiments, a network component and/or a proxy component (e.g., network component (102), proxy component (136)) is any hardware (e.g., circuitry), or a combination of hardware and software, capable of receiving network traffic data units and transmitting network traffic data units towards their destination. Examples of a network component (e.g., network component (102), proxy component (136)) and/or the type of system disclosed in FIG. 1 (e.g., system (100)) include, but are not limited to, a switch, a line card, a router, a multi-layer switch, a network chip, an integrated circuit (e.g., an application-specific integrated circuit (ASIC), field-programmable gate array (FPGA)), etc. In one or more embodiments, a network component (e.g., network component (102), proxy component (136)) may also be a network device.

In one or more embodiments, a network port (e.g., network port A (104), network port B (106), network port N (108)) is a network interface capable of transmitting and/or receiving information to and/or from other interfaces of other components and/or devices at any rate of data transfer (e.g., 10 Mb/s, 100 Mb/s, 1 Gb/s, 2.5 Gb/s, 5 Gb/s, 10 Gb/s, 100 Gb/s, etc.). Such network interfaces may provide a path external to the network component (e.g., network component (102), proxy component (136)) to allow for a connection to other devices, and/or may be operatively connected to other devices or components internal to the network component (e.g., network component (102), proxy component (136)) and each such interface may be an ingress and/or egress interface. In one or more embodiments, although not shown in FIG. 1, a network port (e.g., network port A (104), network port B (106), network port N (108)) may also include a proxy engine (e.g., proxy engine A (124), proxy engine B (126), and proxy engine N (128)).

In one or more embodiments, a proxy port (e.g., proxy port A (118), proxy port B (120), proxy port N (122)) includes all of the functionalities of a network port (as described above) and further includes a proxy engine (e.g., proxy engine A (124), proxy engine B (126), and proxy engine N (128)) and a loopback (e.g., loopback A (130), loopback B (132), and loopback N (134)).

In one or more embodiments, a proxy engine (e.g., proxy engine A (124), proxy engine B (126), and proxy engine N (128)) is any hardware (e.g., circuitry), or a combination of hardware and software, capable of receiving data, processing the data to obtain modified data, and transmitting the data. The modification performed by a proxy engine (e.g., 124, 126, 128) may be of any type that transforms the data from one form to another (e.g., encryption, decryption, appending of headers and/or tails, addition and/or removal of tags and/or identifiers, authentication, verification, passthrough (i.e., no modification), etc.). Further, in one or more embodiments, the encryption and/or decryption performed by the proxy engine may be similar to, or some variation of, Medium Access Control type Security (MACsec) as standardized by the Institute of Electrical and Electronics Engineers (IEEE) in IEEE 802.1AE. In one or more embodiments, a proxy engine (e.g., proxy engine A (124), proxy engine B (126), and proxy engine N (128)) may modify only a portion of the data which the proxy engine is provided (e.g., modifying only a payload, but not tunneling headers or the identifier). Additionally, in one or more embodiments, a proxy engine (e.g., proxy engine A (124), proxy engine B (126), and proxy engine N (128)) may be capable of transmitting or causing the transmission of the data to another device or component after modification.

In one or more embodiments, a loopback (e.g., loopback A (130), loopback B (132), and loopback N (134)) is a mechanism that allows a device or component to transmit data then subsequently receive the same data back at the same device or component. For example, as shown in FIG. 1, each proxy port (e.g., proxy port A (118), proxy port B (120), proxy port N (122)) has a corresponding loopback (e.g., loopback A (130), loopback B (132), and loopback N (134)) that allows the proxy port to transmit data to the loopback, where, in turn, the loopback returns that same data back to the proxy port.

One example of a loopback (e.g., loopback A (130), loopback B (132), and loopback N (134)) is to physically connect an egress interface of a device to an ingress interface of that same device. Accordingly, when data is transmitted via the egress interface, the data is then subsequently received at the ingress interface. Similarly, as another example, the loopback (e.g., loopback A (130), loopback B (132), and loopback N (134)) may be the connection between two ingress/egress interfaces, one ingress/egress interface and one egress interface, or one ingress/egress interface and one ingress interface. Additionally, as another example, a loopback (e.g., loopback A (130), loopback B (132), and loopback N (134)) may be a physical loopback on a single ingress/egress interface (where only a single physical interface exists for both the egress and ingress of data).

Alternatively, in one or more other embodiments, a loopback may not be a physical mechanism at all, but rather, the loopback may be logic internal to the device the loopback services. For example, in one or more embodiments, as shown in FIG. 1, loopback A (130) may be an internal logical setting of the proxy port A (118) that requires no external components or devices. In one or more embodiments, when a loopback (e.g., loopback A (130), loopback B (132), and loopback N (134)) is active and/or present on a proxy port (e.g., proxy port A (118), proxy port B (120), proxy port N (122)), the proxy port will lose some and/or all of the functionalities of a network port (e.g., the ability to directly connect to other devices outside the proxy component (136))

In one or more embodiments, the system (100) and/or any individual components or devices therein (102, 136), is configured to associate one or more network ports (e.g., network port A (104), network port B (106), network port N (108)) with one or more proxy ports (e.g., proxy port A (118), proxy port B (120), proxy port N (122)). For example, network port A (104) and network port B (106) may be associated with proxy port A (118); accordingly, network traffic data units directed towards or emanating from network port A (104) and/or network port B (106) are transmitted through proxy port A (118). Alternatively, in one or more embodiments, network port A (104), alone, may be associated with multiple proxy ports (e.g., proxy port A (118) and proxy port B (120)); accordingly, network traffic data units directed towards or emanating from network port A (104) are transmitted through proxy port A (118) and/or proxy port B (120). Further, in one or more embodiments, multiple network ports (e.g., network port A (104), network port B (106)) may be associated with multiple proxy ports (e.g., proxy port A (118), proxy port B (120)); accordingly, network traffic data units directed towards or emanating from network port A (104) and/or network port B (106) are transmitted through proxy port A (118) and/or proxy port B (120).

Alternatively, in one or more embodiments, the system (100) and/or any individual components or devices therein (102, 136), may not associate one or more network ports (e.g., network port A (104), network port B (106), network port N (108)) with one or more proxy ports (e.g., proxy port A (118), proxy port B (120), proxy port N (122)). For example, network port N (108) may not be associated with a proxy port (e.g., proxy port A (118), proxy port B (120), proxy port N (122)) and accordingly, the system (100) will not be configured to treat network traffic data units directed towards or emanating from differently than standard network traffic.

In one or more embodiments, a fabric (e.g., fabric (112)) provides an operative connection between network components (e.g., network component (102), proxy component (136)) of a system (e.g., system (100)). For example, a fabric (e.g., fabric (112)) may be an electrical and/or optical bus that enables network components (e.g., network component (102), proxy component (136)) to exchange data. In one or more embodiments, system (100) does not include a fabric (e.g., fabric (112)), and the network component (102) and the proxy component (136) are directly connected.

In one or more embodiments, a fabric access processor (e.g., fabric access processor A (110), fabric access processor B (116)) is any hardware (e.g., circuitry), or combination of hardware and software, capable of coordinating transmission of data between a network port (e.g., 104, 106, 108) and proxy port (e.g., 118, 120, 122) pair. For example, network port A (104) may be paired with proxy port B (120), and/or network port B (106) may be paired with proxy port B (120). In one or more embodiments, the forwarding engine (e.g., 111) of the fabric access processor (e.g., 110), in the same network component (e.g., 102) as one or more network ports (e.g., 104, 106, 108), determines the egress port (not shown) and the type of modification (e.g., encryption, authentication, etc.) for each network traffic data unit received from a network port (e.g., 104, 106, 108). Then, in one or more embodiments, based on this determination, the fabric access processor (e.g., 110) of that network component (e.g., 102) appends various identifiers to each network traffic data unit (received from network ports (e.g., 104, 106, 108) of that network component (e.g., 102)) and transmits the network traffic data units (with appended identifiers) to a fabric access processor (e.g. 116) of the proxy component (e.g., 136) that includes the associated proxy ports (e.g., 118, 120, 122). In one or more embodiments, the fabric access processor (e.g., 116) of the proxy component (e.g., 136) that receives network traffic data units (with appended identifiers), modifies the network traffic data units using its forwarding engine (e.g., 117), analyzes one of the appended identifiers to identify a proxy ports (e.g., 118, 120, 122) and transmits the network traffic data unit to the identified proxy port (e.g., 118, 120, 122).

In one or more embodiments, a fabric access processor (e.g., fabric access processor A (110), fabric access processor B (116)) is any hardware (e.g., circuitry), or combination of hardware and software, capable of coordinating transmission of data between a component of a system (e.g., system (100)) and a fabric (e.g., fabric (112)). For example, in one or more embodiments, a fabric access processor (e.g., fabric access processor A (110), fabric access processor B (116)) receives data in a network component (e.g., network component (102), proxy component (136)) through an ingress port, from a fabric (e.g., fabric (112)), prior to transmitting the data towards the data's destination. Similarly, a fabric access processor (e.g., fabric access processor A (110), fabric access processor B (116)) receives data prior to the data exiting a network component (e.g., network component (102), proxy component (136)) through an egress port into a fabric (e.g., fabric (112)) of a system (e.g., system (100)).

In one or more embodiments, a forwarding engine (FE) (e.g., forwarding engine (FE) A (111), forwarding engine (FE) B (117)) is any hardware (e.g., circuitry), or combination of hardware and software, capable of determining the egress port (not shown) and/or the type of modification to be applied to network traffic data units. Further, in one or more embodiments, a forwarding engine (FE) (e.g., forwarding engine (FE) A (111), forwarding engine (FE) B (117)) is capable of modifying network traffic data units to append, analyze, and remove identifiers. Further, while FIG. 1 shows forwarding engine (FE) A (111) and forwarding engine (FE) B (117) as a component of fabric access processor A (110) and fabric access processor B (116), respectively, a forwarding engine (e.g., forwarding engine (FE) A (111), forwarding engine (FE) B (117)) may be located elsewhere inside or outside of the disclosed system (100). Further, data traversing a system (e.g., system (100)) need not necessarily be handled by a forwarding engine (e.g., forwarding engine (FE) A (111), forwarding engine (FE) B (117)), but rather, the data may already be directed towards the data's destination by the transmitting device without any action required by a forwarding engine (e.g., forwarding engine (FE) A (111), forwarding engine (FE) B (117)).

While FIG. 1 shows a configuration of devices and/or components, other configurations may be used without departing from the scope of the disclosure. For example, although network component (102) is displayed with only three network ports (network port A (104), network port B (106), network port N (108)), one of ordinary skill in the art, having the benefit of this Detailed Description, would appreciate that there can be any number of network ports in the disclosed network component (102). Similarly, although proxy component (136) is shown with only three proxy ports (proxy port A (118), proxy port B (120), proxy port N (122)), one of ordinary skill in the art, having the benefit of this Detailed Description, would appreciate that there can be any number of proxy ports in proxy component (136). Accordingly, embodiments disclosed herein should not be limited to the configuration of devices and/or components shown in FIG. 1.

Figure 2:
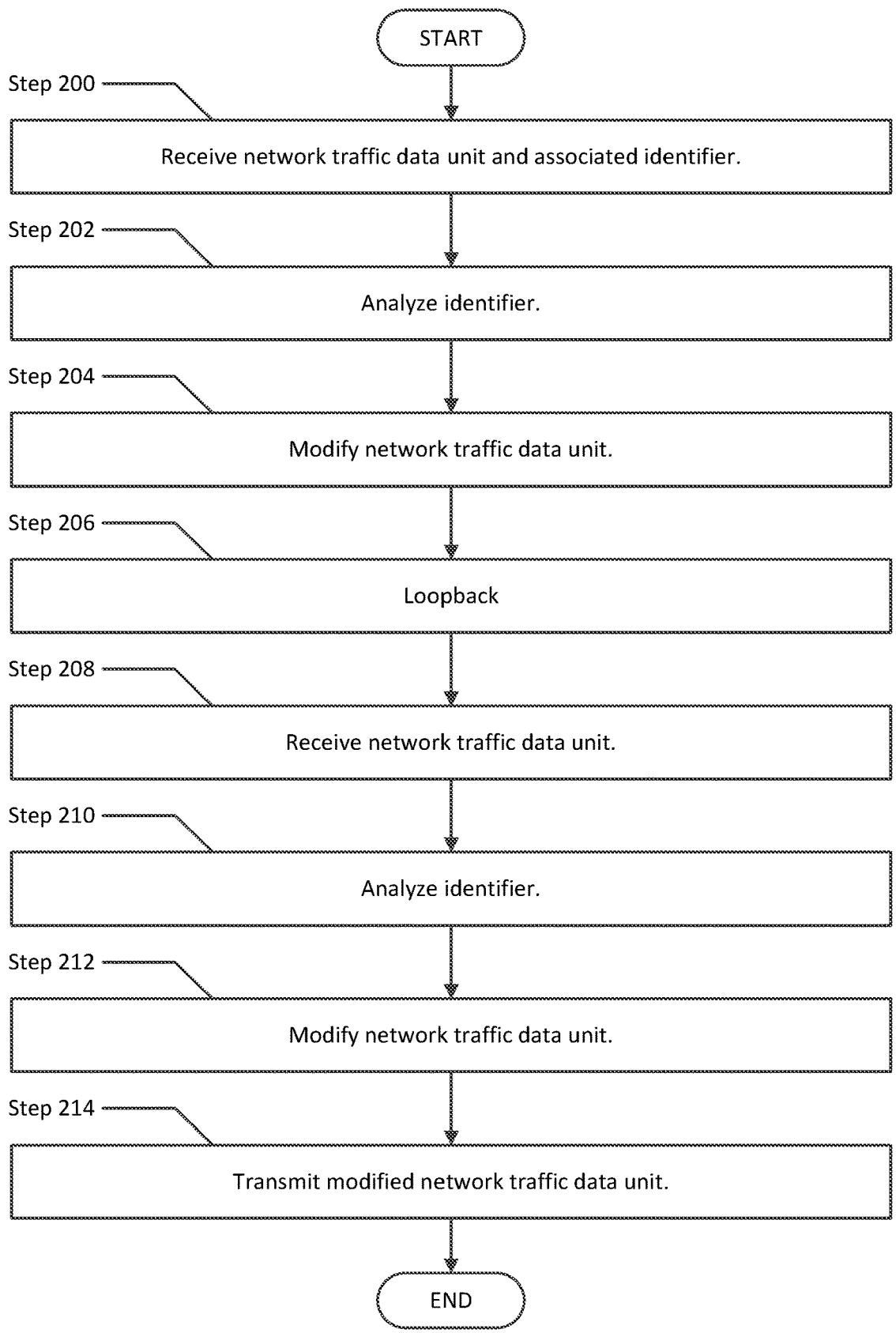
FIG. 2 shows a flowchart in accordance with one or more embodiments.

FIG. 2 shows a flowchart describing a method of how a proxy port handles incoming network traffic data units according to one or more embodiments. While the various steps in this flowchart are presented and described sequentially, one of ordinary skill in the art, having the benefit of this Detailed Description, would appreciate that some or all of the steps may be executed in different orders, may be combined or omitted, and some or all of the steps may be executed in parallel.

In Step 200, the proxy port receives the network traffic data unit and the associated identifier. In one or more embodiments, a network traffic data unit may be any unit of data that traverses through a network (e.g., frames, packets, tunneling protocol frames, etc.) that may include any form of data (e.g., payload, headers, other content, etc.). Further, the network traffic data unit may be received via an operative connection between the proxy port and a fabric access processor of the same network component. Alternatively, in one or more embodiments, the network traffic data unit is received directly by the proxy port via an ingress port of the network component to which the proxy port belongs.

In one or more embodiments, an identifier is data that includes information about the network traffic data unit. For example, in one or more embodiments, the identifier may indicate (i) the port through which the network traffic data unit will exit the system (e.g., egress port), (ii) other ports through which the network traffic data unit is intended to traverse, (iii) the direction of the network traffic data unit ("transmit"/"outbound" or "receive"/"inbound"/"incoming"), (iv) the type of processing and/or modification to apply to the network traffic data unit, (v) any tunneling protocol that encapsulates the payload of the network traffic data unit (e.g., Multiprotocol Label Switching (MPLS) Architecture as described in the Internet Engineering Task Force (IETF) Request for Comments (RFC) 3031, Virtual eXtensible Local Area Network (VXLAN) as described in IETF RFC7348), (vi) entropy information used for the tunneling protocol, and/or (vii) the tunnel interface (e.g., the network port and/or network interface through which the network tunnel traverses) and associated tunnel header encapsulation. In one or more embodiments, the identifier is included as part of the network traffic data unit; alternatively, in one or more embodiments, the identifier is not part of the network traffic data unit, but is merely associated with the network traffic data unit. In one or more embodiments, there may be a second identifier that indicates some or all of the possible information indicated by the first identifier in addition to other information not indicated in the first identifier.

In Step 202, the proxy port analyzes the identifier. In one or more embodiments, the proxy port analyzes the identifier to determine various properties about the network traffic data unit, including the direction of the network traffic data unit, the port with which the network traffic data unit is associated, and/or what type of modification to perform on the network traffic data unit. In one or more embodiments, the proxy port may additionally analyze portions of the network traffic data unit itself if information is lacking in the identifier. For example, the proxy port may determine a destination of the network traffic data unit based on headers inside the network traffic data unit and therefore determine the network port from which the network traffic data unit emanated, or is destined to traverse prior to exiting the system. Similarly, in one or more embodiments, the proxy port may determine a direction of the network traffic data unit based on an analysis of the network traffic data unit headers.

In one or more embodiments, the proxy port makes a determination, based on the proxy port's analysis of the identifier, about the direction of the network traffic data unit. In one or more embodiments, the direction of the network traffic data unit is a property stored in the identifier associated with the network traffic data unit. For example, the identifier will indicate the direction of the network traffic data unit without the system (or any device or component therein) having to make a determination about the direction of the network traffic data unit (other than reading the identifier).

Alternatively, in one or more embodiments, the direction of the network traffic data unit may be determined by other properties of the network traffic data unit and the identifier. For example, when the network traffic data unit is destined to exit the system by traversing a designated network port that is associated with a proxy port, it may be determined that the network traffic data unit is traveling in an "outbound" or "transmit" direction. For example, if the network traffic data unit is intended to exit the system through a network port (e.g., network port A) (and the system is configured to associate the network port with a proxy port (e.g., proxy port A)), the network traffic data unit is traversing the system in a "transmit" or "outbound" direction. Alternatively, in one or more embodiments, if the network traffic data entered the system through a network port (that the system is configured to associate with a proxy port), the system is configured to identify that the network traffic data unit is traversing the system in a "receive", "incoming", or "inbound" direction.

While, in one or more embodiments, a network traffic data unit may have both a "transmit" and "receive" direction (if the network traffic data unit was to merely enter the system through one port and exit through another); as used herein, the terms "transmit", "outbound", "receive", "incoming", and "inbound" are given special meaning to indicate the direction of the network traffic data unit with respect to the network port through which they are intended to traverse ("transmit"/"outbound") or through which the have already traversed ("receive"/"incoming"/"inbound").

In one or more embodiments, the determination of the direction is limited. For example, in one or more embodiments, the network traffic data unit is either traveling in (i) a "transmit" direction or (ii) a "receive" direction; thus, merely determining whether the identifier indicates "transmit" is sufficient to determine the direction. For example, if the identifier indicates "transmit", the network traffic data unit is therefore traveling in a "transmit" (or "outbound") direction; however, if the identifier does not indicate "transmit", the network traffic data unit is therefore traveling in a "receive" (or "incoming"/"inbound") direction. Alternatively, in one or more embodiments, there may exist other possible directions the network traffic data unit is traveling. Further, in one or more embodiments, the proxy port may be configured to definitively determine the direction indicated in the identifier without making any assumption based on a lack of particular specified direction.

In Step 204, the proxy engine associated with the proxy port modifies the network traffic data unit. As described above in the description of FIG. 1, the proxy engine may modify the network traffic data unit in any number of ways including, but not limited to, encryption, decryption, appending of headers and/or tails, addition and/or removal of tags and/or identifiers, authentication, verification, passthrough (i.e., no modification), or some combination thereof. For example, the proxy engine may encrypt a portion of the network traffic data unit (e.g., the payload), remove a portion of the identifier, and append headers and tails to the encrypted portion to identify the type of encryption used. The type of modification to be performed by the proxy engine may be (i) indicated by the identifier associated with the network traffic data unit, (ii) automatic by virtue of the functionalities of the proxy engine, (iii) indicated by other data or tags that are part of and/or associated with the network traffic data unit, and/or (iv) indicated by another component of the system. Once the network traffic data unit is modified by the proxy engine, the modified network traffic data unit is transmitted to the loopback of the proxy port.

In Step 206, the modified network traffic data unit traverses the loopback. In one or more embodiments, the loopback of the proxy port receives the modified network traffic data unit and then transmits the modified network traffic data unit back to proxy port. As described above in the description of FIG. 1, the loopback of the proxy port may be a physical loopback, where the modified network traffic data unit physically exits the proxy port through an egress interface (or combined egress/ingress interface) before re-entering the proxy port through an ingress interface (or the same or another combined egress/ingress interface). Alternatively, in one or more embodiments, the loopback may be logic internal to the proxy port, where the proxy port is configured to handle data traversing the internal loopback as though the data entered the proxy port through an ingress interface.

In Step 208, similar to Step 200, the proxy port receives the network traffic data unit. In the instance where the network traffic data unit was modified (e.g., encrypted) during Step 204, the network traffic data unit will be received already encrypted and with the identifier. Alternatively, in one or more embodiments, if the 'modification' of Step 204, was to simply passthrough the network traffic data unit (without modification to the content or structure of the network traffic data unit), the network traffic data unit will be received back at the proxy port unmodified and with the identifier.

In Step 210, like Step 202, the proxy port analyzes the identifier to determine the direction and status of the network traffic data unit. In one or more embodiments, all of analysis performed in Step 202 is also performed in Step 210.

In Step 212, the proxy port again modifies the network traffic data unit. As described in Step 204, the proxy engine may modify the network traffic data unit in any number of ways including, but not limited to, encryption, decryption, appending of headers and/or tails, addition and/or removal of tags and/or identifiers, authentication, verification, passthrough (i.e., no modification), or some combination thereof. In one or more embodiments, if the network traffic data unit was passed through the proxy port (without modification to the content of the network traffic data unit) during Step 204, the proxy port will modify (e.g., decrypt) the network traffic data unit during Step 212. In one or more embodiments, all possible forms of modification described in Step 204 may also be performed in Step 212.

In Step 214, the proxy port transmits the modified network traffic data unit towards the modified network traffic data unit's destination. For example, in one or more embodiments, after the proxy port (and any proxy engine therein) finishes modifying the network traffic data unit, the modified network traffic data unit is then treated as ordinary network traffic as the diversion and modification of the network traffic data unit has completed through the proxy port. Accordingly, in one or more embodiments, the proxy port transmits the modified network traffic data unit from the proxy port towards the originally intended destination of the network traffic data unit.

Figure 3:
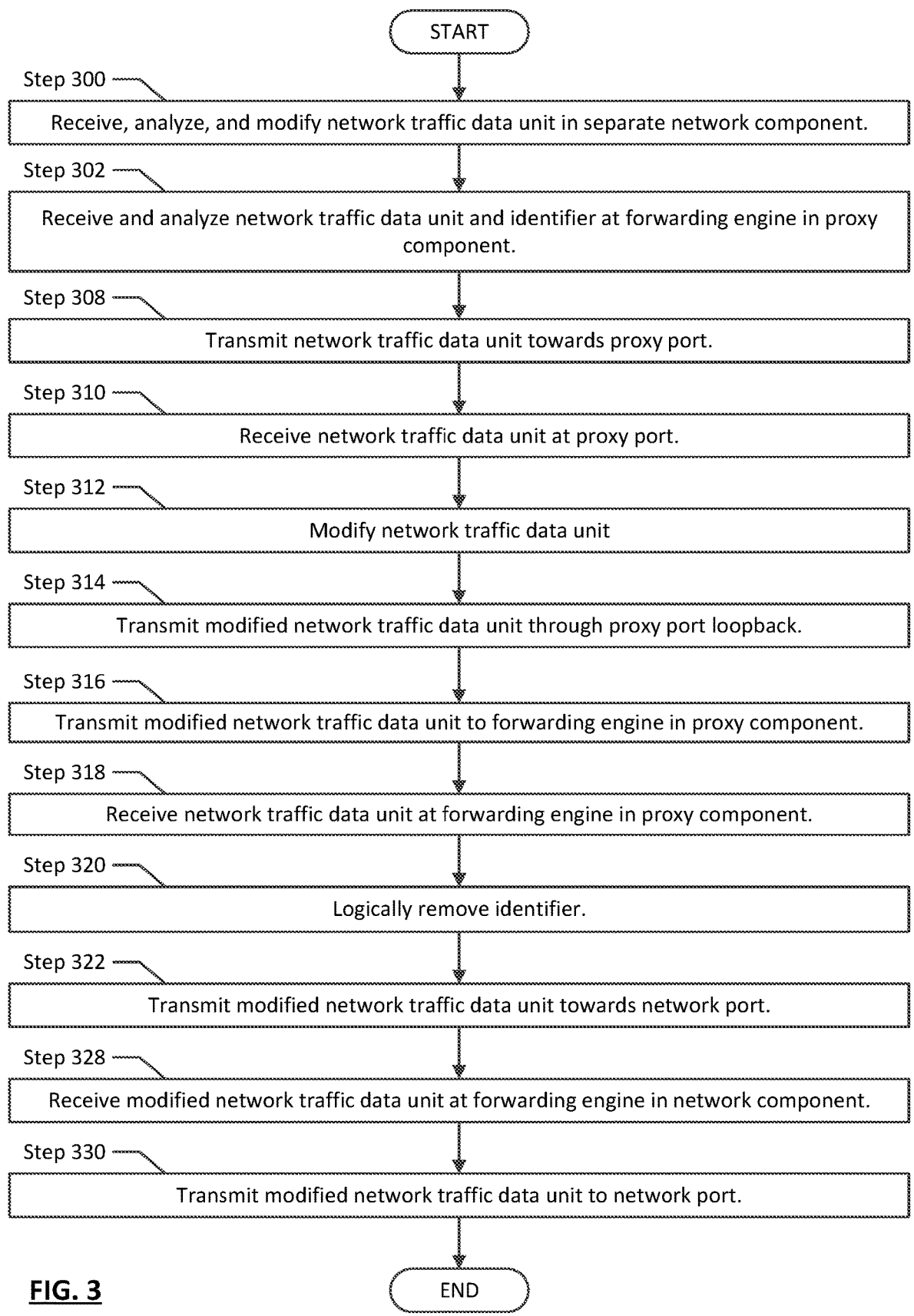
FIG. 3 shows a flowchart in accordance with one or more embodiments.

FIG. 3 shows a flowchart describing a method of how a system handles outgoing (e.g., "transmit"/"outbound") network traffic data units according to one or more embodiments. While the various steps in this flowchart are presented and described sequentially, one of ordinary skill in the art, having the benefit of this Detailed Description, would appreciate that some or all of the steps may be executed in different orders, may be combined or omitted, and some or all of the steps may be executed in parallel.

In Step 300, a network traffic data unit is received via a network port of a network component separate from the proxy component. When received by the network port of the separate network component, the network traffic data unit contains no identifiers indicating any special handling. However, in one or more embodiments, the network traffic data unit received from the network port of the separate network component contains information (e.g., headers) that indicates the network traffic data unit is intended to exit the system through a specific network port.

In one or more embodiments, after receiving the network traffic data unit (via a network port of the separate network component), the network traffic data unit is transmitted to a fabric access processor (FAP) of the separate network component. In one or more embodiments, the fabric access processor (FAP) of the separate network component analyzes the network traffic data unit to determine the network port through which the network traffic data unit is going to exit the system. In one or more embodiments, the fabric access processor (FAP) of the separate network component determines that the network traffic data unit is intended to traverse a network port that is associated with a proxy port. Accordingly, in one or more embodiments, as a result of the determination, the fabric access processor (FAP) of the separate network component appends one or more identifiers to the network traffic data unit. As described above in the description of Step 200, in one or more embodiments, the identifier may indicate (i) the port through which the network traffic data unit will exit the system (e.g., an egress port), (ii) other ports through which the network traffic data unit is intended to traverse, (iii) the direction of the network traffic data unit, (iv) the type of processing and/or modification to apply to the network traffic data unit, (v) any tunneling protocol that encapsulates the payload of the network traffic data unit, and/or (vi) entropy information used for the tunneling protocol.

In one or more embodiments, the network traffic data unit (and identifiers appended by the fabric access processor (FAP)) is transmitted to the proxy component (containing the proxy port associated with the identified network port) via a fabric of the system that operatively connects the separate network component to the proxy component.

In Step 302, the network traffic data unit and associated identifier arrive at a forwarding engine of a proxy component. In one or more embodiments, the forwarding engine analyzes the identifier of the network traffic data unit. In one or more embodiments, the forwarding engine is configured to recognize that when the identifier specifies a network port that is associated with a proxy port, the forwarding engine is configured to transmit the network traffic data unit towards that associated proxy port. For example, if a network traffic data unit arrives at the forwarding engine with an identifier indicating that the network traffic data unit is associated with network port A; the forwarding engine is configured to transmit the network traffic data unit towards proxy port A (the proxy port associated with network port A).

In one or more embodiments, the forwarding engine is configured to analyze the identifier of the network traffic data unit to determine which direction the network traffic data unit is traversing the system. For example, if a network traffic data unit arrives at the forwarding engine with an identifier indicating that the network traffic data unit is traversing the system in a "outbound" direction; the forwarding engine is configured to transmit the network traffic data unit towards an associated proxy port (e.g., proxy port A). In one or more embodiments, the forwarding engine does not require analysis of the associated network port of the network traffic data unit. Rather, in one or more embodiments, the mere existence of an identifier that indicates a direction is sufficient to transmit the network traffic data unit towards an associated proxy port.

Alternatively, in the event that a network traffic data unit arrives at the forwarding engine with no identifier (or any other data indicating that the network traffic data unit is associated with a proxy port), the network traffic data unit is handled as ordinary network traffic. For example, if the network traffic data unit is destined for network port C, and network port C is not associated with a proxy port, the forwarding engine merely transmits the network traffic data unit towards network port C, thereby ending the process.

In Step 308, the forwarding engine of the proxy component transmits the network traffic data unit towards the proxy port. In one or more embodiments, the forwarding engine determines that the network traffic data unit is to be transmitted to the proxy port associated with the network port specified in the identifier. In one or more embodiments, the proxy port is identified from the identifier of the network traffic data unit, or from any headers the forwarding engine may have appended to the network traffic data unit.

In Step 310, the network traffic data unit is received at the proxy port. As described above in the description of Step 204, in one or more embodiments, once the proxy port receives the network traffic data unit, the proxy port makes a determination about the direction the network traffic data unit is traversing the system. In one or more embodiments, the network traffic data unit and the identifier indicate that the network traffic data unit is traveling through the system in a "transmit" (or "outbound") direction.

In Step 312, the proxy port modifies the network traffic data unit. In one or more embodiments, the proxy engine of the proxy port modifies the network traffic data unit. As described above in the description of FIG. 1, the modification may take any form (encryption, decryption, appending of headers and/or tails, addition and/or removal of tags and/or identifiers, authentication, verification, passthrough (i.e., no modification), or some combination thereof) and may be indicated by the identifier associated with the network traffic data unit and/or may be automatic by virtue of the functionalities of the proxy engine. For example, where the network traffic data unit is traversing the system in a "transmit" direction, the proxy engine may encrypt the payload of the network traffic data unit and append corresponding headers and tails that are specific to the type of encryption performed.

In Step 314, the modified network traffic data unit is transmitted through the loopback of the proxy port. In one or more embodiments, after the modification of the network traffic data unit is complete, the proxy port transmits the modified network traffic data unit to the loopback of the proxy port. As described above in the description of FIG. 1, the loopback may be either physical or logical and merely ensures that the proxy port treats the network traffic data unit (modified or not) as if the network traffic data unit were arriving through an ingress interface of the proxy port.

In Step 316, the proxy port transmits the modified network traffic data unit to the forwarding engine of the proxy component. In one or more embodiments, after the proxy port receives the modified network traffic data unit from the loopback of the proxy port, the proxy port analyzes the direction of the modified network traffic data unit (as specified in the identifier) and is configured to transmit the modified network traffic data unit to the forwarding engine of the proxy component. Further, in one or more embodiments, after receiving the modified network traffic data unit from the loopback, the proxy port will again analyze the identifier and perform a modification. As described above with respect to FIG. 1 (and Steps 204, 212, and 312), 'modification' may include a passthrough, where the content and structure of the network traffic data unit remains unaltered. For example, as the direction of the modified network traffic data unit is "transmit", and the modification has already occurred, the proxy port merely passes the modified network traffic data unit through the proxy port without any additional modification and transmits the modified network traffic data unit to the forwarding engine of the proxy component (to which the proxy port also belongs).

In Step 318, the forwarding engine of the proxy component receives the modified network traffic data unit. In one or more embodiments, once the modified network traffic data unit is received by the fabric access processor, the fabric access processor determines that the modified network traffic data unit is traveling in an "outbound" direction (as indicated in the identifier) and thus the modified network traffic data unit is to be transmitted towards the network port through which the modified network traffic data unit is intended to exit the system. Alternatively, in one or more embodiments, the fabric access processor identifies that modification of the network traffic data unit has occurred and determines that the modified network traffic data unit is to be transmitted towards the network port through which the modified network traffic data unit is intended to exit the system.

In Step 320, the identifier is, at least, logically removed. In one or more embodiments, the forwarding engine of the proxy component logically removes the identifier associated with the modified network traffic data unit. Accordingly, in one or more embodiments, the modified network traffic data unit no longer includes (or is transmitted with) an identifier indicating properties of the modified network traffic data unit. Rather, in one or more embodiments, the modified network traffic data unit continues to traverse the system as ordinary network traffic without any special routing or modification.

Additionally, in one or more embodiments, the forwarding engine of the proxy port adds a tunnel header to the modified network traffic data unit, where the tunnel header is determined by the tunnel interface specified in the identifier (as described above in the description of Step 200). Thus, in one or more embodiments where a tunnel header is appended to the modified network traffic data unit, the modified network traffic data unit will traverse the associated network tunnel, through the tunnel interface specified in the identifier, based on that tunnel header.

In Step 322, the fabric access processor (that comprises the forwarding engine) of the proxy component transmits the modified network traffic data unit towards the network port (through which the modified network traffic data unit is intended to exit the system as indicated in the identifier prior to removal). In one or more embodiments, the proxy component may not be directly connected to the network component that includes the network port, thus the fabric access processor of the proxy component transmits the modified network traffic data unit to the fabric of the system.

In Step 328, the modified network traffic data unit is received by the fabric access processor (and the forwarding engine therein) of the network component that includes the network port. In one or more embodiments, the forwarding engine of the network component analyzes the modified network traffic data unit and determines the network traffic data unit is destined for the network port. In one or more embodiments, as the modified network traffic data unit no longer includes an identifier, the fabric access processor processes the modified network traffic data unit as ordinary network traffic.

In Step 330, the fabric access processor of the network component transmits the modified network traffic data unit to the network port of the network component. In one or more embodiments, as the modified network traffic data unit no longer includes an identifier, the forwarding engine of the fabric access processor processes and transmits the modified network traffic data unit to the network port as ordinary network traffic. In one or more embodiments, the modified network traffic data unit will traverse the network port and towards the destination of the modified network traffic data unit.

Figure 4:
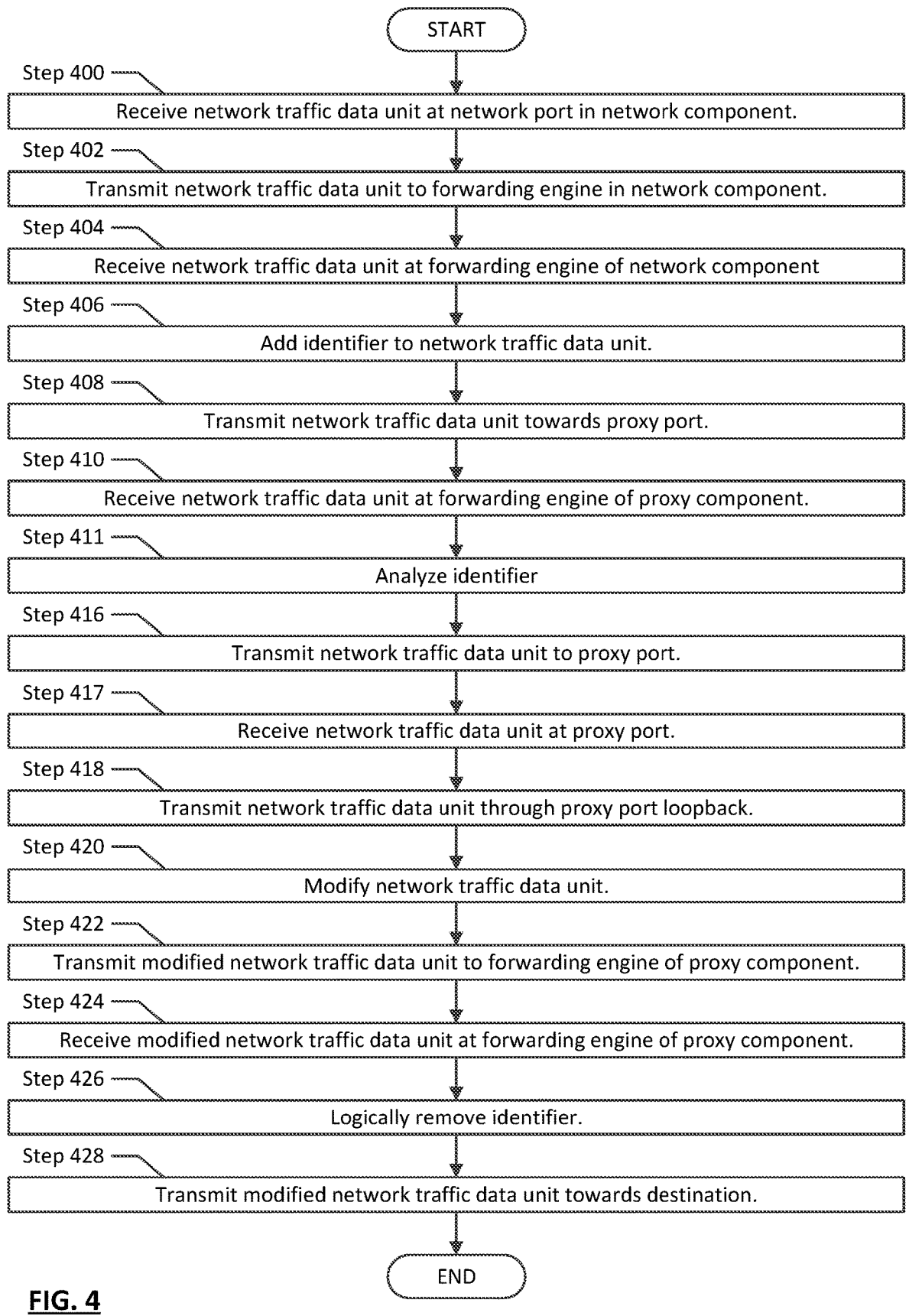
FIG. 4 shows a flowchart in accordance with one or more embodiments.

FIG. 4 shows a flowchart describing a method of how a system handles incoming (e.g., "receive"/"incoming"/"inbound") network traffic data units according to one or more embodiments. While the various steps in this flowchart are presented and described sequentially, one of ordinary skill in the art, having the benefit of this Detailed Description, would appreciate that some or all of the steps may be executed in different orders, may be combined or omitted, and some or all of the steps may be executed in parallel.

In Step 400, a network port receives a network traffic data unit. In one or more embodiments, the network traffic data unit does not include an identifier, and accordingly, the network port processes the modified network traffic data unit as ordinary network traffic. In one or more embodiments, the network traffic data unit may include headers and tails indicating properties of the network traffic data unit (e.g., that a portion of the network traffic data unit is encrypted and what type of encryption was used).

In Step 402, the network port transmits the network traffic data unit to the forwarding engine in the fabric access processor of the network component.

In Step 404, the forwarding engine receives the network traffic data unit from the network port. In one or more embodiments, the forwarding engine is configured to identify network traffic data units that emanate from network ports associated with proxy ports and process those network traffic data units further.

In Step 406, the forwarding engine of the network component adds an identifier to the network traffic data unit. In one or more embodiments, the identifier may indicate, at least, (i) a network port of origin into the system, (ii) any ports through which the network traffic data unit is intended to traverse, (iii) the direction of the network traffic data unit, (iv) the type of processing and/or modification to apply to the network traffic data unit, (v) any tunneling protocol that encapsulates the payload of the network traffic data unit, and/or (vi) entropy information used for the tunneling protocol. Additionally, in one or more embodiments, in the "receive" (or "inbound") direction, the forwarding engine logically removes any network tunnel information and/or entropy information from the network traffic data unit.

In Step 408, the forwarding engine of the network component transmits the network traffic data unit towards the proxy port. In one or more embodiments, after the forwarding engine of the network component adds the identifier to the network traffic data unit, the fabric access processor (that contains the forwarding engine) transmits the network traffic data unit towards the proxy port associated with the network port (from which the network traffic data unit originally traversed (in Steps 400-402)). However, in one or more embodiments, the network component that includes the proxy port may not be directly connected to the network component, instead, the fabric access processor transmits the network traffic data unit to the fabric of the system.

In Step 410, a network traffic data unit and associated identifier arrive at a forwarding engine of the proxy component that comprises the proxy port associated with the network port. As described above in the description of Step 200, in one or more embodiments, the identifier may indicate (i) a port of origin into the system, (ii) any ports through which the network traffic data unit is intended to traverse, (iii) the direction of the network traffic data unit, (iv) the type of processing and/or modification to apply to the network traffic data unit, (v) any tunneling protocol that encapsulates the payload of the network traffic data unit, and/or (vi) entropy information used for the tunneling protocol.

In Step 411, the forwarding engine of the proxy component analyzes the identifier of the network traffic data unit. In one or more embodiments, the mere existence of an identifier that indicates a proxy port is sufficient to transmit the network traffic data unit towards that indicated proxy port. Alternatively, in one or more embodiments, the forwarding engine is configured to recognize that when the identifier specifies a network port (that has an associated proxy port), the forwarding engine is to transmit the network traffic data unit to that proxy port. For example, if a network traffic data unit arrives at the forwarding engine with an identifier indicating that the network traffic data unit is associated with network port A; the forwarding engine is configured to transmit the network traffic data unit towards proxy port A (the proxy port associated with network port A). In one or more embodiments, the forwarding engine does not require analysis of the direction of the network traffic data unit.

In one or more embodiments, the forwarding engine is configured to analyze the identifier of the network traffic data unit to determine which direction the network traffic data unit is traversing the system. For example, if a network traffic data unit arrives at the forwarding engine with an identifier indicating that the network traffic data unit is traversing the system in a "receive" direction; the forwarding engine is configured to transmit the network traffic data unit towards an associated proxy port (e.g., proxy port A). In one or more embodiments, the forwarding engine does not require analysis of the associated network port of the network traffic data unit. Rather, in one or more embodiments, the mere existence of an identifier that indicates a direction is sufficient to transmit the network traffic data unit towards an associated proxy port.

Additionally, in one or more embodiments, the forwarding engine of the proxy port will remove any tunnel header from the modified network traffic data unit. That is, in one or more embodiments, the modified network traffic data unit will have completed traversing a network tunnel (where the proxy component is the termination/destination of the network tunnel) and thus the tunnel header is no longer necessary for the transmission of the modified network traffic data unit.

In Step 416, the fabric access processor that comprises the forwarding engine of the proxy component transmits the network traffic data unit to the proxy port. In one or more embodiments, the fabric access processor determines that the network traffic data unit is to be transmitted to the proxy port associated with the network port specified in the identifier. In one or more embodiments, the proxy port is identified from the identifier of the network traffic data unit, or from any headers the forwarding engine may have appended to the network traffic data unit.

In Step 417, the proxy port receives the network traffic data unit. In one or more embodiments, once the proxy port receives the network traffic data unit, the proxy port makes a determination about the direction the network traffic data unit is traversing the system. In one or more embodiments, the network traffic data unit and the identifier indicate that the network traffic data unit is traveling through the system in a "receive" (or "inbound") direction. Further, in one or more embodiments, after receiving and analyzing the network traffic data unit, the proxy port modifies the network traffic data unit. As described above with respect to FIG. 1 (and Steps 204, 212), 'modification' may include a pass-through, where the content and structure of the network traffic data unit remain unaltered. In one or more embodiments, if the identifier indicates that the network traffic data unit is traversing the system in "receive" direction, the proxy port 'modification' is to simply pass the network traffic data unit through the proxy port, to the loopback, without modifying the content or structure of the network traffic data unit.

In Step 418, the modified network traffic data unit is transmitted through the loopback of the proxy port. As described above in the description of FIG. 1, the loopback may be either physical or logical and merely ensures that the proxy port treats the network traffic data unit (modified or not) as if the network traffic data unit were arriving through an ingress interface of the proxy port. In one or more embodiments, the proxy port receives the network traffic data unit and identifies that the network traffic data unit is traversing the system in a "receive" direction. Accordingly, in one or more embodiments, the proxy port does not initially perform any modification to the network traffic data unit, but rather, the proxy port passes the network traffic data unit, unmodified, to the loopback of the proxy port.

In Step 420, after receiving the network traffic data unit back from the loopback, the proxy engine of the proxy port modifies the network traffic data unit. As described above in the description of FIG. 1, the modification may take any form (encryption, decryption, appending of headers and/or tails, addition and/or removal of tags and/or identifiers, authentication, verification, passthrough (i.e., no modification), or some combination thereof) and may be indicated by the identifier associated with the network traffic data unit and/or may be automatic by virtue of the functionalities of the proxy engine. As an example, where the network traffic data unit is traversing the system in a "receive" direction, the proxy engine may decrypt the payload of the network traffic data unit using corresponding headers and tails that are specific to the type of encryption performed. Additionally, after the decryption of the payload, the proxy engine may remove any headers and tails that were used in the decryption process.

In Step 422, the proxy port transmits the modified network traffic data unit to the forwarding engine of the proxy component. In one or more embodiments, as the fabric access processor (comprising the forwarding engine) of the proxy component receives and transmits data traversing the proxy component, the modified network traffic data unit is transmitted to the fabric access processor.

In Step 424, the forwarding engine of the proxy component receives the modified network traffic data unit. In one or more embodiments, the forwarding engine of the proxy component identifies that modification of the network traffic data unit is complete and determines that the modified network traffic data unit is to be transmitted towards the destination of the modified network traffic data unit.

In Step 426, the identifier is, at least, logically removed. In one or more embodiments, the forwarding engine of the proxy component logically removes the identifier associated with the modified network traffic data unit. Accordingly, in one or more embodiments, the modified network traffic data unit no longer includes (or is transmitted with) an identifier indicating properties of the modified network traffic data unit. Rather, in one or more embodiments, the modified network traffic data unit continues to traverse the system as ordinary network traffic without any special routing or modification.

Additionally, in one or more embodiments, the forwarding engine of the proxy port will remove any tunnel header appended the modified network traffic data unit. That is, in one or more embodiments, the modified network traffic data unit will have completed traversing a network tunnel (where the proxy component is the termination/destination of the network tunnel) and thus the tunnel header is no longer necessary for the transmission of the modified network traffic data unit.

Further, in one or more embodiments, the forwarding engine analyzes the headers of the unencrypted network traffic data unit to determine a network device (e.g., next hop device, destination device) to transmit the encrypted network traffic data unit towards. Further, in one or more embodiments, in the unencrypted state, the formerly encrypted portions of the unencrypted network traffic data unit become readable by network devices that process the unencrypted network traffic data unit; and, accordingly, in one or more embodiments, the forwarding engine analyzes formerly encrypted headers of the unencrypted network traffic data unit to determine a network device (e.g., next hop, destination, etc.) to transmit the encrypted network traffic data unit towards.

In Step 428, the forwarding engine of the proxy component transmits the modified network traffic data unit towards the destination of the modified network traffic data unit. However, in one or more embodiments, as the network component that includes the proxy port may not be directly operatively connected to the destination, the fabric access processor transmits the modified network traffic data unit to the fabric of the system. As described above in the description of FIG. 1, a forwarding engine in another network component may receive the modified network traffic data unit before continuing to transmit to the modified network traffic data unit towards the destination of the modified network traffic data unit.

Figure 5:
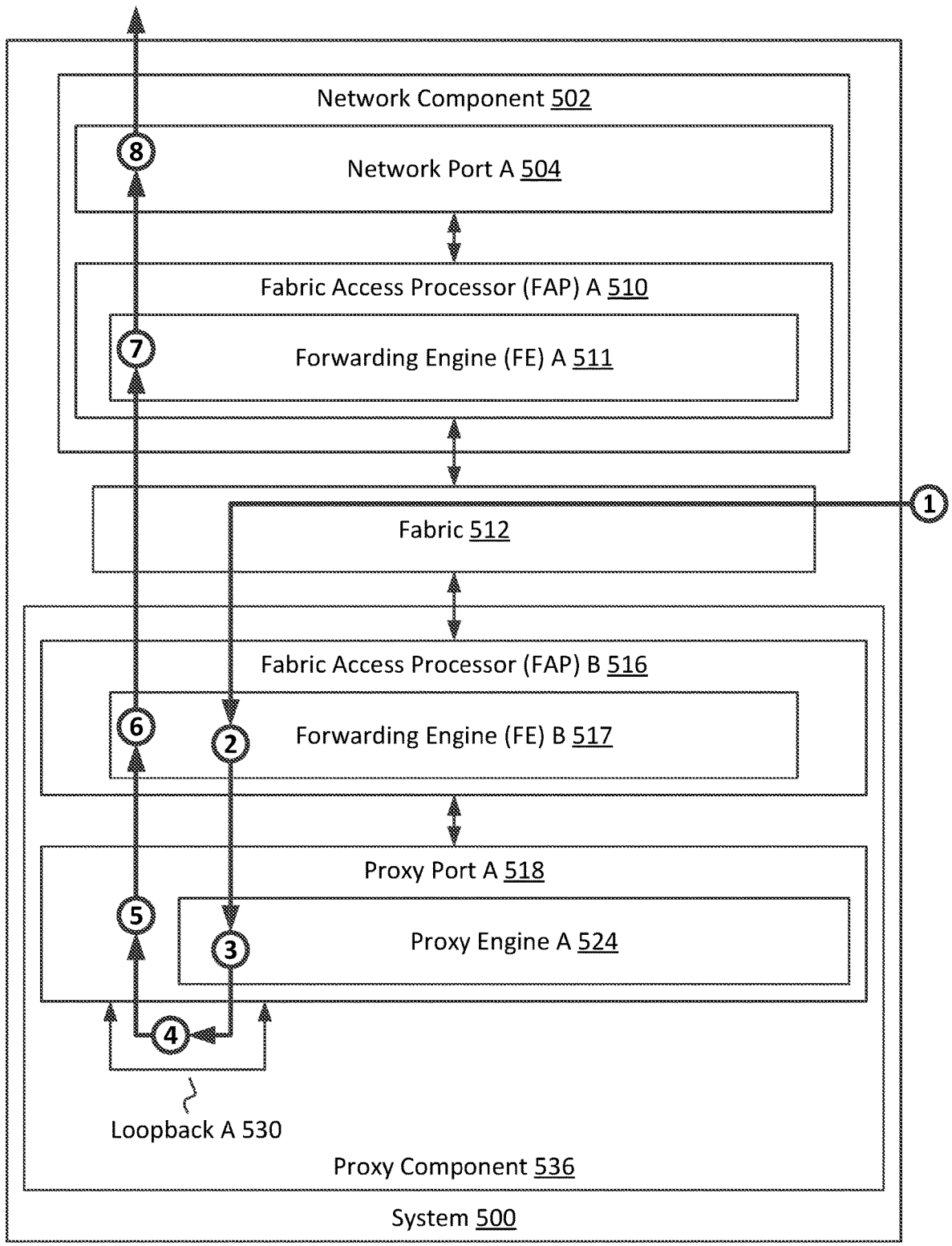
FIG. 5 shows an example in accordance with one or more embodiments.

FIG. 5 shows an example in accordance with one or more embodiments. The following use case is for explanatory purposes only and not intended to limit the scope to this embodiment.

Use Case 1

In FIG. 5, consider a scenario in which, at (1), a network traffic data unit is received via a network port (not shown) of a network component (not shown). When received by the network port (not shown) of the network component (not shown), the network traffic data unit contains no identifiers indicating any special handling. However, the network traffic data unit received via the network port (not shown) of the network component (not shown) contains information (e.g., headers) that indicates the network traffic data unit is intended to exit the system through network port A (504).

In one or more embodiments, after receiving the network traffic data unit (via a network port (not shown) of the network component (not shown)), the network traffic data unit is transmitted to a fabric access processor (FAP) (not shown) of the network component (not shown). In one or more embodiments, the fabric access processor (FAP) (not shown) of the network component (not shown) analyzes the network traffic data unit to determine the network port through which the network traffic data unit is going to exit the system (i.e., network port A (504)). In one or more embodiments, the fabric access processor (FAP) (not shown) of the network component (not shown) determines that the network traffic data unit is intended to traverse a network port A (504), and that network port A (504) is associated with a proxy port A (518).

Accordingly, in one or more embodiments, as a result of the determination, the fabric access processor (FAP) (not shown) of the network component (not shown) appends an identifier to the network traffic data unit that indicates an egress port (e.g., "network port A") of the system and a direction of the network traffic data unit (e.g., "transmit", "outbound"). Specifically, in this case, the identifier indicates "Network Port A" and "transmit".

In one or more embodiments, the network traffic data unit (and identifier appended by the fabric access processor (FAP) (not shown)) is transmitted to proxy component (536) via fabric (512) of the system (500) that operatively connects the network component (not shown) to the proxy component (536).

At (2), forwarding engine (FE) B (517) in the proxy component (536) receives a network traffic data unit from fabric (512) originating outside the system (500). The network traffic data unit arrives at the forwarding engine (FE) B (517) unencrypted, but includes the identifier appended by the fabric access processor (FAP) (not shown) of the network component (not shown). In one or more embodiments, forwarding engine (FE) B (517) is configured to identify, based on the identifier, that the network traffic data unit is destined to exit the system (500) through network port A (504) and the forwarding engine (FE) B (517) is further configured to recognize the identifier indicates that the network traffic data unit is to be transmitted to proxy port A (618). Accordingly, forwarding engine (FE) B (517) transmits the network traffic data unit to proxy port A (518) instead of towards network port A (504).

At (3), proxy port A (518) receives the network traffic data unit and utilizes proxy engine A (524) to (i) encrypt the network traffic data unit, (ii) add a header and tail to the network traffic data unit (e.g., specifying MACsec type encryption), and (iii) add a security tag to the network traffic data unit.

At (4), Once the network traffic data unit is fully modified, proxy port A (518) then transmits the encrypted network traffic data unit through loopback A (530) thereby making the encrypted network traffic data unit appear as if the encrypted network traffic data unit is re-entering proxy port A (518) (as explained above, the loopback may be strictly internal logic and thus the network traffic data unit may never physically leave proxy port A (518)).

At (5), proxy port A (518) re-receives the network traffic data unit and determines that the network traffic data unit was received from loopback A (53) and that the identifier indicates a "transmit" direction. Accordingly, proxy port A (518) passes the network traffic data unit through to fabric access processor B (516) without additional modification by proxy engine A (524).

At (6), fabric access processor B (516) and forwarding engine (FE) B (516) therein, receives the encrypted network traffic data unit and logically removes the identifier of the encrypted network traffic data unit. Accordingly, the encrypted network traffic data unit is treated as standard network traffic after the identifier is removed. The fabric access processor B (516), and forwarding engine (FE) B (516) therein, then transmits the encrypted network traffic data unit towards network port A (504) through fabric (512).

At (7), fabric access processor A (510) of network component (502) and forwarding engine (FE) A (511) therein, receives the encrypted network traffic data unit. There, forwarding engine (FE) A (511) identifies that the encrypted network traffic data unit is destined for network port A (504) and consequently transmits the encrypted network traffic data unit to network port A (504).

At (8), network port A (504) receives the encrypted network traffic data unit from the fabric access processor A (510), and forwarding engine (FE) A (511) therein. In turn, network port A (504) transmits the encrypted network traffic data unit towards the encrypted network traffic data unit's destination outside of the system (500).

Figure 6:
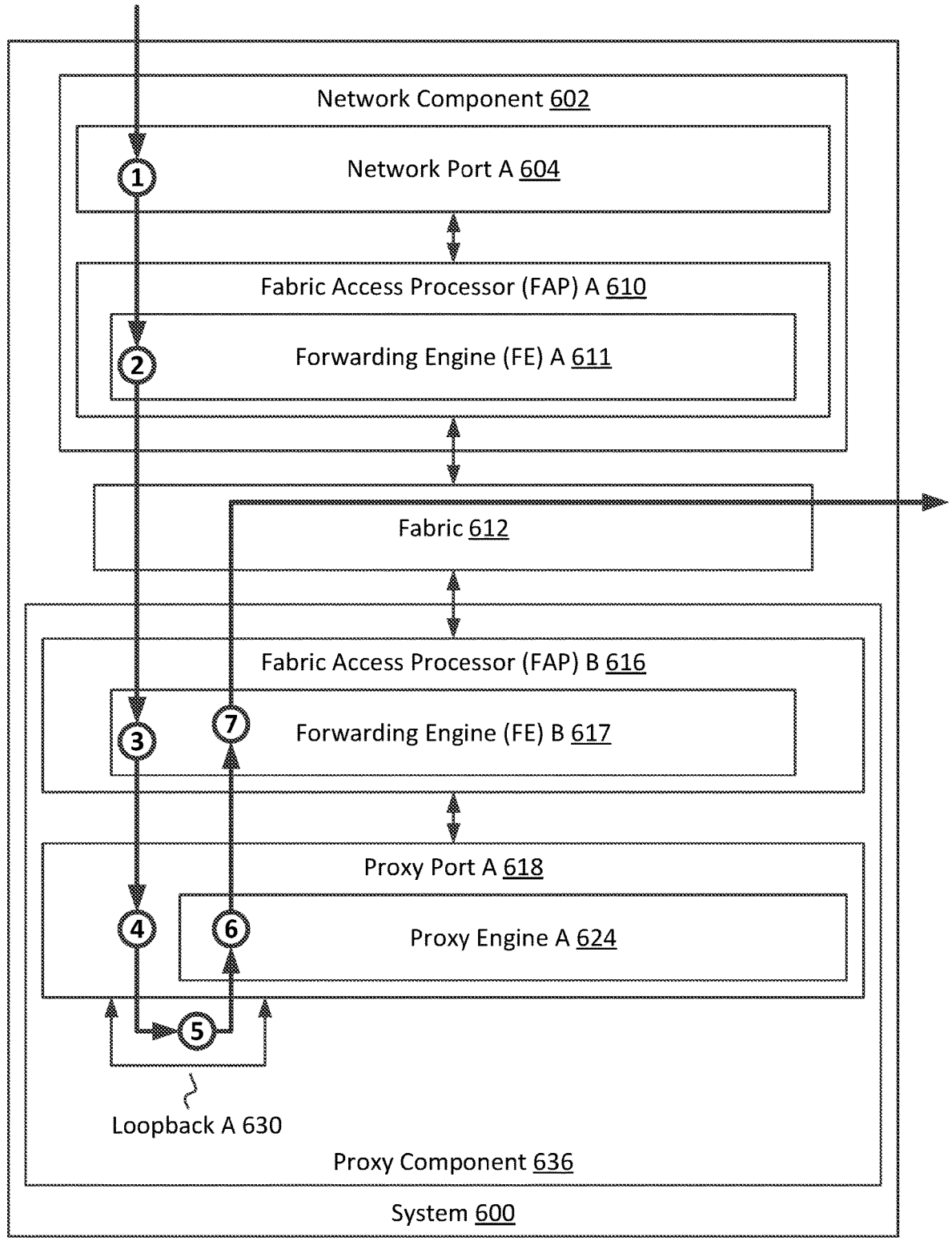
FIG. 6 shows an example in accordance with one or more embodiments.

FIG. 6 shows an example in accordance with one or more embodiments. The following use case is for explanatory purposes only and not intended to limit the scope to this embodiment.

Use Case 2

In FIG. 6, consider a scenario in which at (1) network port A (604) of network component (602) receives an encrypted network traffic data unit from outside of the system (600). The encrypted network traffic data unit arrives with no identifier and is transmitted to fabric access processor A (610) and forwarding engine (FE) A (611) therein.

At (2), forwarding engine (FE) A (611) adds an identifier to the encrypted network traffic data unit that indicates, at least, an ingress port (e.g., "network port A") of the system from whence the encrypted network traffic data unit came and a direction of the network traffic data unit (e.g., "receive"/"incoming"/"inbound"). Specifically, in this case, the identifier indicates "Network Port A" and "receive". Further, forwarding engine (FE) A (611) is configured to identify the proxy port associated with the network port of origin. Specifically, in this instance, forwarding engine (FE) A (611) is configured to identify that "Network Port A" (i.e., network port A (604)) is associated with Proxy Port A (618) and accordingly transmits the encrypted network traffic data unit towards proxy port A (618) (through fabric (612)), instead of towards the destination of the encrypted network traffic data.

At (3), forwarding engine (FE) B (617) of proxy component (636) receives the encrypted network traffic data unit and associated identifier. Forwarding engine (FE) B (617) then analyzes the identifier appended by forwarding engine (FE) A (611) at (2). Specifically, forwarding engine (FE) B (617) analyzes the identifier and determines that it indicates (i) the network traffic data unit is being forwarded to proxy port A (618), and (ii) that the network traffic data unit is a "receive" network traffic data unit. Accordingly, forwarding engine (FE) B (617) transmits the encrypted network traffic data unit towards proxy port A (618).

At (4), proxy port A (618) receives the encrypted network traffic data unit from forwarding engine (FE) B (617). Proxy port A (618) then identifies that the encrypted network traffic data unit includes an identifier indicating that the encrypted network traffic data unit is traversing the system in a "receive" direction. Accordingly, proxy port A (618) passes the encrypted network traffic data unit through to loopback A (630).

At (5), proxy port A (618) transmits the encrypted network traffic data unit through loopback A (630) thereby making the encrypted network traffic data unit appear as if the encrypted network traffic data unit is re-entering proxy port A (618) (as explained above, the loopback may be strictly internal logic and thus the network traffic data unit may never physically leave proxy port A (618)).

At (6), proxy port A (618) re-receives the encrypted network traffic data unit and identifies that the encrypted network traffic data unit is not yet modified. Proxy port A (618) then utilizes proxy engine A (624) to (i) decrypt the network traffic data unit using, at least, headers and tails of the encrypted network traffic data unit (e.g., specifying MAC sec type encryption), (ii) removing the header and tail of the network traffic data unit, and (iii) removing security tags of the network traffic data unit. Once the decryption has occurred, the network traffic data unit is transmitted towards the network traffic data unit's destination outside the system (600) via the fabric access processor B (616).

At (7), forwarding engine (FE) B (617) of fabric access processor B (616) receives the network traffic data unit. As the network traffic data unit is no longer encrypted, based on the appended identifier, forwarding engine (FE) B (617) treats the network traffic data unit as if the network traffic data unit was ordinary network traffic (emanating from network port A (604)). Accordingly, as the network traffic data unit is destined for a device outside of the system (600), forwarding engine (FE) B (617) transmits the network traffic data unit towards the network traffic data unit's destination as if the network traffic data unit was standard network traffic.

One or more embodiments make it possible to encrypt, decrypt, and/or otherwise secure network traffic that (normally) utilize network ports that are incapable of such security functions. Specifically, in one or more embodiments, network traffic (utilizing ports incapable of performing encryption and decryption) is diverted to proxy ports that additionally include encryption and encryption functionalities and are further configured to handle diverted network traffic (e.g., using a loopback). By diverting the network traffic to the proxy ports, the network traffic is able to be encrypted and/or decrypted before being transmitted back towards its destination. In one or more embodiments, the proxy ports are capable of encrypting traffic prior to exiting a network device through a network port; and in one or more embodiments, the proxy ports are capable of decrypting traffic after entering a network device through a network port. In one or more embodiments, certain network ports are associated with certain proxy ports, such that all network traffic entering and/or exiting a device through one or more network ports may be encrypted and/or decrypted by one or more associated proxy ports.

While one or more embodiments have been described herein with respect to a limited number of embodiments and examples, those skilled in the art, having benefit of this disclosure, would appreciate that other embodiments can be devised which do not depart from the scope of the embodiments disclosed herein. Accordingly, the scope should be limited only by the attached claims.

What is claimed is:

1. A method for modifying network traffic data, comprising:

receiving a network traffic data unit comprising an identifier at a proxy port of a proxy component;

based on the identifier, performing a first proxy port action set to obtain a first modified network traffic data unit comprising an updated identifier;

transmitting the first modified network traffic data unit towards an egress port;

looping back the first modified network traffic data unit from the egress port to an ingress port;

based on the updated identifier, performing a second proxy port action set to obtain a second modified network traffic data unit; and transmitting the second modified network traffic data unit to a network port of a network device, wherein the network port is incapable of performing at least one of the first proxy port action set or the second proxy port action set, and wherein:
the updated identifier indicates an outbound direction of the network traffic data unit, and
based on the outbound direction, the second proxy port action set comprises encrypting the first modified network traffic data unit to obtain the second modified network traffic data unit.

2. The method of claim 1, wherein:
the network traffic data unit comprises a header that indicates the network port, and
prior to receiving the network traffic data unit by the network device, the network traffic data unit is directed to the proxy port from a forwarding engine based on the header.

3. The method of claim 2, wherein the forwarding engine associates the proxy port with the network port.

4. The method of claim 1, wherein the encrypting is Media Access Control Security (MACsec) type encryption.

5. The method of claim 1, wherein:
the identifier indicates an inbound direction of the network traffic data unit, and
based on the inbound direction, the first proxy port action set comprises decrypting the network traffic data unit to obtain the first modified network traffic data unit.

6. The method of claim 5, wherein decrypting the network traffic data unit comprises:
verifying that content of the first modified network traffic data unit has not been modified.

7. The method of claim 1, wherein prior to receiving the network traffic data unit:
the identifier is added to the network traffic data unit by a forwarding engine, wherein the identifier further indicates the network port.

8. The method of claim 1, wherein prior to receiving the network traffic data unit:
based on the identifier of the network traffic data unit, the network traffic data unit is directed to the proxy port from a forwarding engine.

9. The method of claim 1, wherein modifications performed by the first proxy port action set are related to data security.

10. A system, comprising:
a network device, comprising:
a network port; and
a first forwarding engine;
a fabric operatively connected to the network device; and
a proxy device operatively connected to the fabric, comprising:
a second forwarding engine; and
a proxy port,
wherein the proxy port is configured to:
receive a network traffic data unit comprising an identifier;
based on the identifier, perform a first proxy port action set to obtain a first modified network traffic data unit comprising an updated identifier;
transmit the first modified network traffic data unit towards an egress port;
looping back the first modified network traffic data unit from the egress port to an ingress port;
based on the updated identifier, performing a second proxy port action set to obtain a second modified network traffic data unit; and
transmitting the second modified network traffic data unit to the network port,
wherein the network port is incapable of performing at least one of the first proxy port action set or the second proxy port action set, and
wherein:
the updated identifier indicates an outbound direction of the network traffic data unit, and
based on the outbound direction, the second proxy port action set comprises encrypting the network traffic data unit to obtain the first modified network traffic data unit.

11. The system of claim 10, wherein:
the network traffic data unit comprises a header that indicates the network port, and
prior to receiving the network traffic data unit, the network traffic data unit is directed to the proxy port from a third forwarding engine based on the header.

12. The system of claim 11, wherein the third forwarding engine associates the proxy port with the network port.

13. The system of claim 10, wherein the encrypting is Media Access Control Security (MACsec) type encryption.

14. The system of claim 10, wherein:
the identifier indicates an inbound direction of the network traffic data unit, and
based on the inbound direction, the first proxy port action set comprises decrypting the network traffic data unit to obtain the first modified network traffic data unit.

15. The system of claim 14, wherein decrypting the network traffic data unit comprises:
verifying that content of the first modified network traffic data unit has not been modified.

16. The system of claim 10, wherein prior to receiving the network traffic data unit:
the identifier is added to the network traffic data unit by the first forwarding engine, wherein the identifier further indicates the network port.

17. The system of claim 10, wherein prior to receiving the network traffic data unit:
based on the identifier of the network traffic data unit, the network traffic data unit is directed to the proxy port from the first forwarding engine.

18. The system of claim 10, wherein modifications performed by the first proxy port action set are related to data security.

* * * * *